June 21, 1955 G. H. KRAWINKEL 2,711,478

STORING ELECTRICAL SIGNALS AND TRANSFERRING THE STORED SIGNALS INTO A DIFFERENT CIRCUIT

Filed April 18, 1952 2 Sheets-Sheet 1

INVENTOR.
GUENTHER H. KRAWINKEL

BY Theodore Haake

ATTORNEY

INVENTOR.
GUENTHER H. KRAWINKEL
BY Theodore Haffner
ATTORNEY

United States Patent Office 2,711,478

Patented June 21, 1955

2,711,478

STORING ELECTRICAL SIGNALS AND TRANSFERRING THE STORED SIGNALS INTO A DIFFERENT CIRCUIT

Guenther H. Krawinkel, Frankfort am Main Eschersheim, Germany

Application April 18, 1952, Serial No. 283,149

9 Claims. (Cl. 250—27)

The invention relates to improvements in or relating to the storing of and transferring electrical signals representative of intelligence.

There are systems known for this purpose which due to the short intervals of charging and discharging of certain capacitors are adapted to store only small electrical charges; thus the resulting signal if transferred to another circuit has only a small value which does not exceed the noise level of this latter circuit.

One of the objects of the invention is to provide an arrangement to deflect a cathode ray beam in such a way to traverse a number of capacitors charged according to the instantaneous values of the signal to be stored and transferred whereby it is further deflected, in a direction perpendicular to the plane of motion causing transversal of capacitors.

Figure 1:
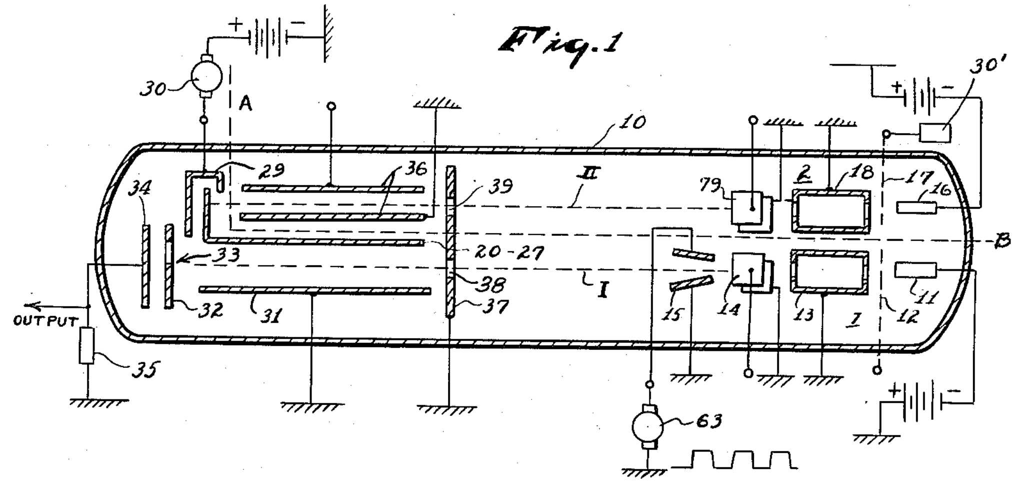
Figure 2:
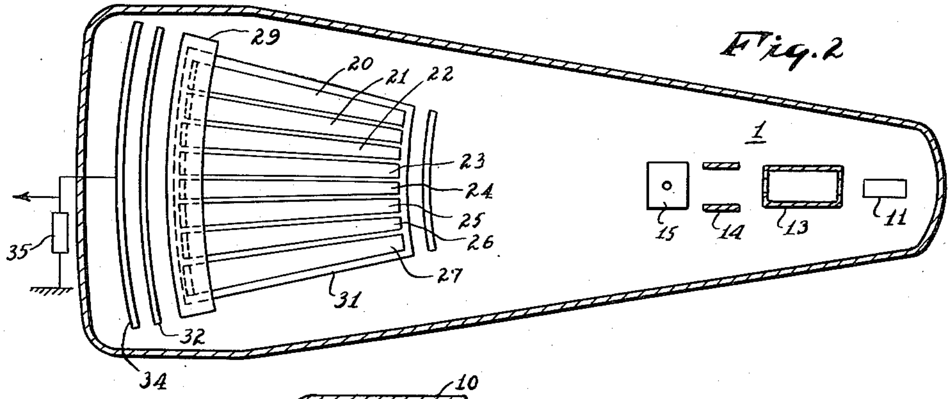
Figure 3:
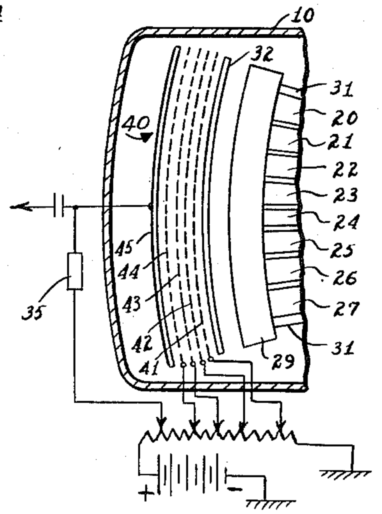
Figures 4, 5, 6, 7, 8, 9, 10:
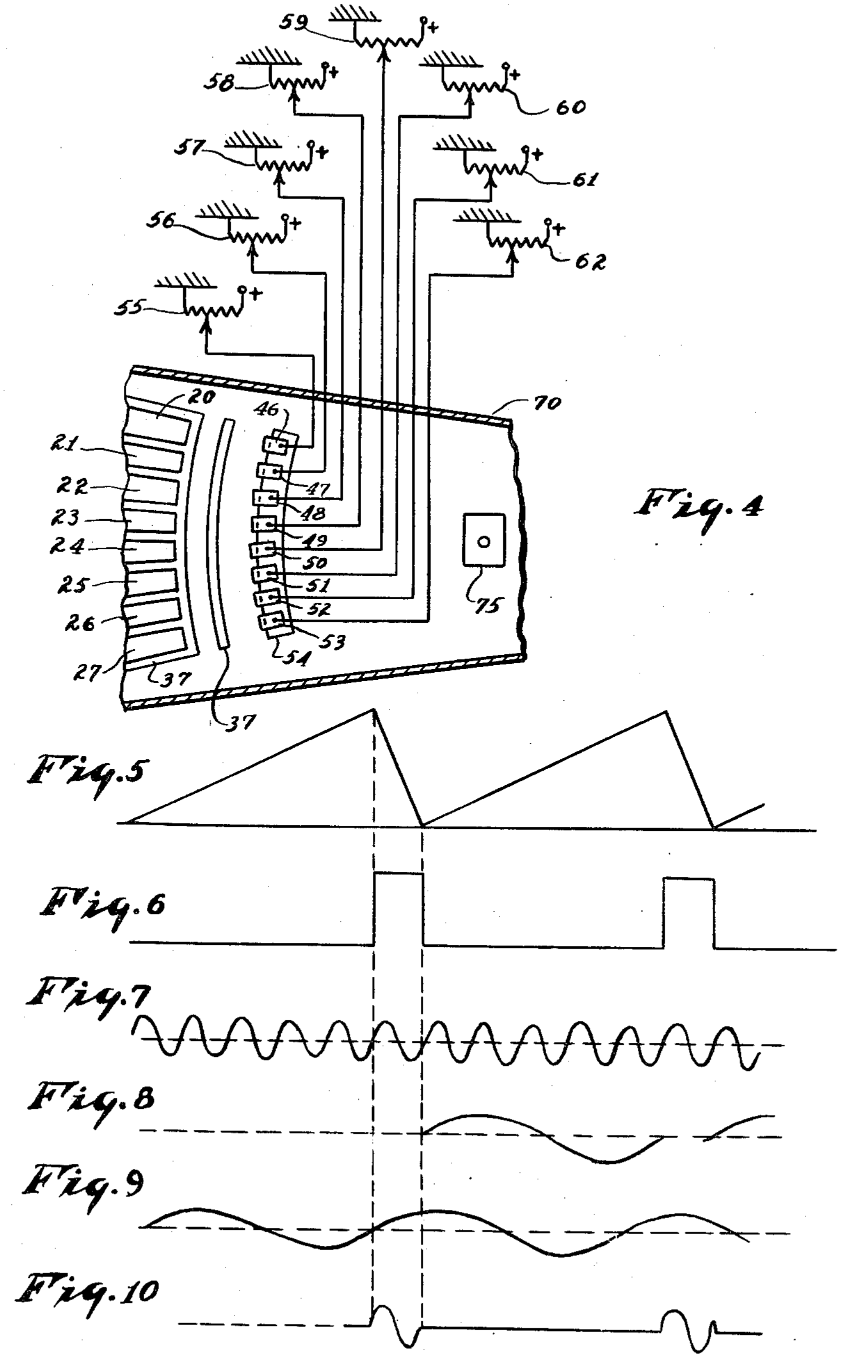

This and other objects of the invention will be more fully described in the drawings annexed herewith, in which Fig. 1 represents a realization of the invention in elevation, partially in section, Fig. 2 represents a plan view of the realization of Fig. 1, partially in section, drawn along the line A—B in Fig. 1, Fig. 3 represents a portion of a modification of Figs. 1 and 2 showing an electron multiplier connected to a certain electrode, Fig. 4 represents a portion of a realization improved with respect to that of Figs. 1 and 2 which will either insure desired characteristics or improve the function of the first realization of the invention and Figs. 5 through 10 represent waveforms useful in explaining the function of a form of the invention to insure time expansion or time compression of an electrical signal.

Referring to Figs. 1 and 2 there is shown partially in section, a vacuum tube 10 comprising a first cathode ray gun 1 containing cathode 11, control grid 12, anode 13 and two pairs of deflection plates 14 and 15 respectively. Fig. 1 further shows a second cathode ray gun 2, second cathode 16, second control grid 17, second anode 18 and a second pair of deflection plates 19.

The first cathode ray I generated and accelerated by gun 1 traverses the space between a number of insulated electrodes 20 to 27 having the form of strips and as seen in Fig. 2 arranged side by side in such manner as to converge with their elongated edges in the centre of deflection of plates 14. The left hand ends of the strips 20 to 27 are bent upwards so as to be impinged by the second cathode ray II generated by gun 2 and deflected by plates 19. The left hand ends of strips 20 to 27 are surrounded by a first common electrode 29 to receive any secondary electrons excited on these ends by beam II, and connected to a source of signals supplying the signals to be stored and transferred, for example derived as shown from an electrical generator 30.

Opposite to the lower surface of insulated electrodes 20 to 27 there is provided a second common electrode 31 having the shape of a section of a broad ring whose centre coincides with the centre of deflection of plates 14.

Adjacent the left hand side of the capacitors formed by strips 20 to 27 and the second common electrode 31 there is provided a first diaphragm 32 having an edge 33 extending in the plane wherein beam I is deflected by plates 14.

Adjacent diaphragm 32, a target electrode 34 is connected to an output impedance 35 which forms a part of any utilization circuit to which the stored signals are to be transferred.

Another pair of deflection plates 36 is arrayed parallel to strips 20 to 27 to deflect beam II in a manner to be explained with another realization of the invention to be described further below.

Beams I and II traverse a second diaphragm 37 having two slits 38 and 39 to define beams I and II respectively.

Diaphragm 37 should preferably have a secondary emission rate lower than unity. This is achieved preferably by means of a suitable coating on the lower surface of elements 20 to 27, the upper surface of electrode 31 and on first diaphragm 32 as well as on target electrode 34.

In explaining the function of Figs. 1 and 2, elements 12, 15, 17 and 36 will be disregarded, since these elements are important in connecting with the realization of the invention to be described further below.

Beam II of constant intensity is directed under the influence of deflection plates 19 to traverse the left hand ends of strips 20 to 27. Since the secondary emission rates of these ends are greater than unity a strong secondary emission will result at these ends and thereby the potentials of the insulated electrodes will approach the instantaneous values of the signal applied to the first common electrode 29. Then the signal is stored on the insulated electrodes and can be transferred to a utilization circuit at any desired time.

Cathode ray beam I generated by the first gun 1 and directed to second diaphragm 37 under the influence of deflection plates 14 is defined on its cross section by slit 38 in diaphragm 37. After passing slit 37 the beam traverses the capacitors formed by individual insulated electrodes 20 to 27 and second common electrode 31. In the space of these capacitors beam II is deflected in a direction perpendicular to the plane of motion of beam II caused by plates 79, due to the individual charges of the insulated electrodes, and thereby a varying fraction is caused to pass the edge 33 and a corresponding fraction will impinge upon target 34, forming a corresponding current in output impedance 35 which forms a part of the utilization circuit adapted to receive the transferred signal.

Fig. 3 is a modification of the realization of the invention shown in Figs. 1 and 2. In Fig. 3 the largest electrode, target electrode 34 of Fig. 1, is replaced by an electron multiplier 40 well known in the art. The output electrode 45 of multiplier 40 is connected to output impedance 35. Multiplier 40 may comprise a number of grids 41 to 44 each coated to have a secondary emission rate greater than unity and supplied with potentials of successively increasing values to produce on each grid more secondary electrons than on the preceding grid. Any other suitable form of multiplier may be used instead of the multiplier shown. Otherwise of this modification may be used with the elements of Figs. 1 and 2 which therefore are not shown in Fig. 3 and need not to be described in detail.

To insure that beam I moves exactly in a direction parallel to edge 33 of diaphragm 32, a number of additional deflecting plates 46 to 53 cooperating with a grounded common plate 54 may be used as shown in Fig. 4. The plates are supplied with such potentials derived for example from a number of potentiometers 55 to 62 that any undesired motion due to irregularities or outside interference may be compensated for.

Instead of applying the signal to be stored to the first common electrode 29 and having a beam II of constant intensity traversing electrodes 20 to 27 it may be desirable to vary the intensity of beam II according to the signal to be stored and to apply a steady potential to electrode 29.

In order to achieve this purpose, a signal source 30' may be applied to grid 17 as indicated in dotted lines in Fig. 1, all other elements being provided as described above and operating in the manner described in connection with Figs. 1 and 2.

Another modification of the invention is obtained by using the single beam I for storing signals and for transferring the stored signals to the output impedance. To realize this modification of the invention elements 15 and 36 in Figs. 1 and 2 are utilized i. e. those elements, which were disregarded in explaining the operation of Figs. 1 and 2.

In using a single beam I for storing the signals, a square wave form voltage generator diagrammatically shown in Fig. 1 as an ordinary alternator 63 is connected to plates 15 to deflect beam I during the rising portion of any voltage wave feeding plates 14. The resulting deflection is upward causing beam I to enter plates 36. Betwen plates 36 a steady voltage can be provided to redeflect the beam into the direction parallel to the direction of movement before entering the plates 15. During the rising portion of the voltage wave deflecting beam I by means of plates 14, the signals may be stored on the insulated electrodes, during the falling portion of the wave beam I following the path indicated in Fig. 1 will operate to be deflected according to the stored signals and thus produce an output current in accordance therewith.

The invention can be used for the purpose of time expansion or time compression of any signal.

In order to explain this use, it is assumed that a saw tooth generator having the wave form of Fig. 5 is connected to plates 14 and that a square wave generator having the wave form of Fig. 6 is connected to plates 15.

During the fly back stroke or falling portion of the saw tooth wave of Fig. 5, the beam is deflected upward to strike insulated electrodes 20–27 thus storing the part drawn in full lines in Fig. 7 of the signal applied to electrode 29. During the rising portion of the saw tooth wave, these stored charges will be scanned slowly, resulting in a current wave in the output impedance which is expanded in duration as compared with the signal occurring during the short fly back stroke as shown in Fig. 8. It is necessary of course in some way to discharge electrodes 20 to 27 so as to adapt them to receive new charges. In the simplest way, this characteristic is obtained by making the insulation resistance not too high in value; this results in a slow discharge of elements 20 to 27 after the signals have been transferred.

By reversing the phase of the wave form in Fig. 6 by 180° a time compression of signal is obtained. Thus a signal having a wave form as shown in Fig. 9 will be transferred to occur during the short interval shown in Fig. 10.

The invention may be used in many problems in the field of signal transmission. It is particularly useful for the purpose of expanding or compressing a frequency band.

I claim:

1. In an arrangement for storing and transferring electrical signals, a vacuum tube having at least one gun to produce at least one electron beam, a number of insulated electrodes having ends forming targets for said electron beam and receiving charges corresponding to the instantaneous values of the signal to be stored, a first common electrode adjacent to one end of said insulated electrodes to receive secondary electrons emitted by said insulated electrodes, a second common electrode located on the opposite side of the beam and facing said insulated electrodes capacitively coupled thereto, at least one deflection means to deflect said electron beam before entering the spaces between said capacitively coupled electrodes in such a manner as to traverse said coupling spaces successively, at least one diaphragm having an edge located substantially in a position reached by the electrons after traversal of said coupling spaces, and target means having an output impedance connected thereto; said target means being located behind said diaphragm so as to be impinged by at least a portion of the electrons depending upon the individual charges on said capacitively coupled electrodes, whereby the current in said output impedance will vary in accordance to the instantaneous values of the signal.

2. Arrangement according to claim 1 comprising an electron multiplier forming the target electrode of the tube and including a number of grids each coated to have a secondary emission rate of more than unity and an output electrode, and source of potentials of successively increasing value to produce on each grid more secondary electrons than on the preceding grid.

3. Arrangement according to claim 1 wherein said capacitively coupled electrodes have the form of flat strips arranged side by side and extending longitudinally in such direction as to converge in the centre of deflection of said deflection means.

4. Arrangement according to claim 1 comprising additional deflection electrodes arrayed between said deflection means and said coupling spaces and means for supplying different potentials to said additional electrodes to adjust the plane of motion of said electron beam to extend exactly parallel to the edge of said diaphragm.

5. Arrangement according to claim 1 comprising a second diaphragm in front of said coupling spaces to define the cross-section of the beam entering said spaces, said second diaphragm having a secondary electron emission rate lower than unity.

6. Arrangement according to claim 1 wherein the individual electrodes of said capacitively coupled electrodes have a secondary electron emission rate greater than unity.

7. Arrangement according to claim 1 comprising means for applying the signal to be stored to said first common electrode.

8. Arrangement according to claim 1 comprising a second gun to produce an electron beam, including cathode and control grid, and means for applying the signal to be stored to said control grid, whereby the current of said ray beam is varied in accordance with said signal.

9. Arrangement according to claim 1 comprising second deflection means acting perpendicularly to said first deflection means, generating means supplying a voltage of square wave form and connected to said second deflection means, and third deflection means positioned adjacent said insulated electrodes to redeflect the electron beam into a direction substantially parallel to the direction of the beam before entering said first deflection means, whereby storing and transferring of said signal is achieved alternatingly by a single electron beam.

References Cited in the file of this patent

UNITED STATES PATENTS

| | | |
|---|---|---|
| 2,404,106 | Snyder | July 16, 1946 |
| 2,535,055 | Ferguson | Dec. 26, 1950 |
| 2,618,763 | Snyder | Nov. 18, 1952 |